H. BROWN.

CRATE.

APPLICATION FILED NOV. 15, 1915.

Reissued Jan. 11, 1916.

14,042.

3 SHEETS—SHEET 1.

WITNESS

Frank A. Fahle

INVENTOR

Hugh Brown,

BY

Hood & Schley

ATTORNEYS

H. BROWN.

CRATE.

APPLICATION FILED NOV. 15, 1915.

Reissued Jan. 11, 1916.

14,042.

3 SHEETS—SHEET 2.

WITNESS

Frank A. Fahle

INVENTOR

Hugh Brown,

BY

Hood & Schley

ATTORNEYS

H. BROWN.
CRATE.
APPLICATION FILED NOV. 15, 1915.
Reissued Jan. 11, 1916.
14,042.
3 SHEETS—SHEET 3.
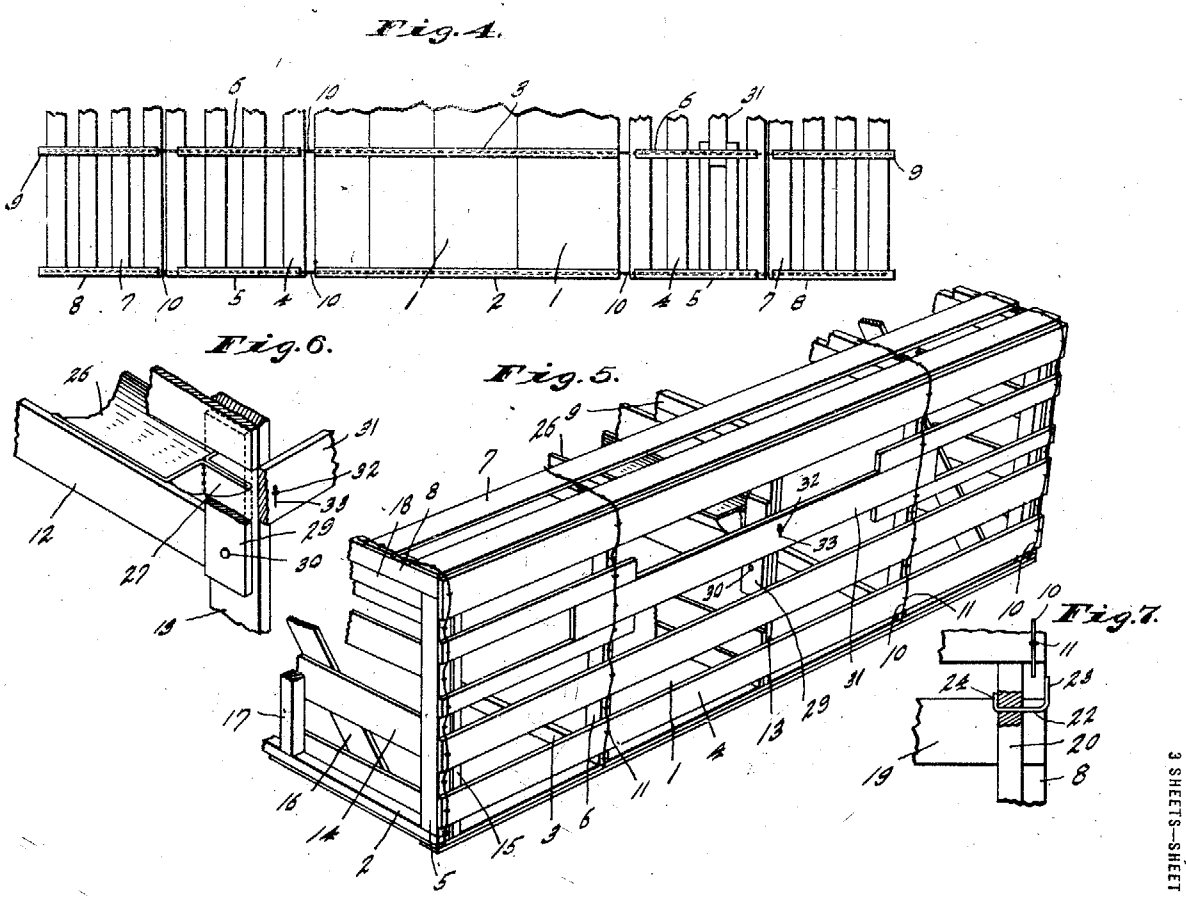
WITNESS
Frank A. Fahle
INVENTOR
Hugh Brown,
BY
Hood & Sebley
ATTORNEYS

UNITED STATES PATENT OFFICE.

HUGH BROWN, OF BATTLE CREEK, MICHIGAN, ASSIGNOR TO THE GREENSTREET FOLDING BOX MACHINE CO., OF INDIANAPOLIS, INDIANA, A CORPORATION OF ARIZONA.

CRATE.

14,042. Specification of Reissued Letters Patent. Reissued Jan. 11, 1916.

Original No. 1,056,146, dated March 18, 1913, Serial No. 588,188. Application for reissue filed November 15, 1915. Serial No. 61,703.

*To all whom it may concern:*

Be it known that I, HUGH BROWN, a citizen of the United States, residing at Battle Creek, in the county of Calhoun, State of Michigan, have invented a new and useful Crate, of which the following is a specification.

This invention relates to improvements in crates.

The main objects of this invention are, first, to provide a crate which may be made of considerable size and of light material, and, at the same time, be very strong and durable and capable of withstanding racking strains and other strains to which it would be subjected when used as a shipping crate. Second, to provide an improved crate which is adapted to be shipped from the factory in the knock-down and easily and quickly set up by the user. Third, to provide an improved crate adapted for use as a poultry crate with improved doors, which can be easily manipulated and which can be opened when another crate or object is resting upon and partially covering the top of the crate, or when objects are against the ends of the crate.

Further objects, and objects relating to structural details, will definitely appear from the detailed description to follow.

I accomplish the objects of my invention by the devices and means described in the following specification. The structure described constitutes one effective embodiment of my invention.

Other embodiments would be readily devised by those skilled in the art.

The invention is clearly defined and pointed out in the claims.

A structure constituting an effective and preferred embodiment of the features of my invention is clearly illustrated in the accompanying drawings, forming a part of this specification, in which:—

Figure 1:
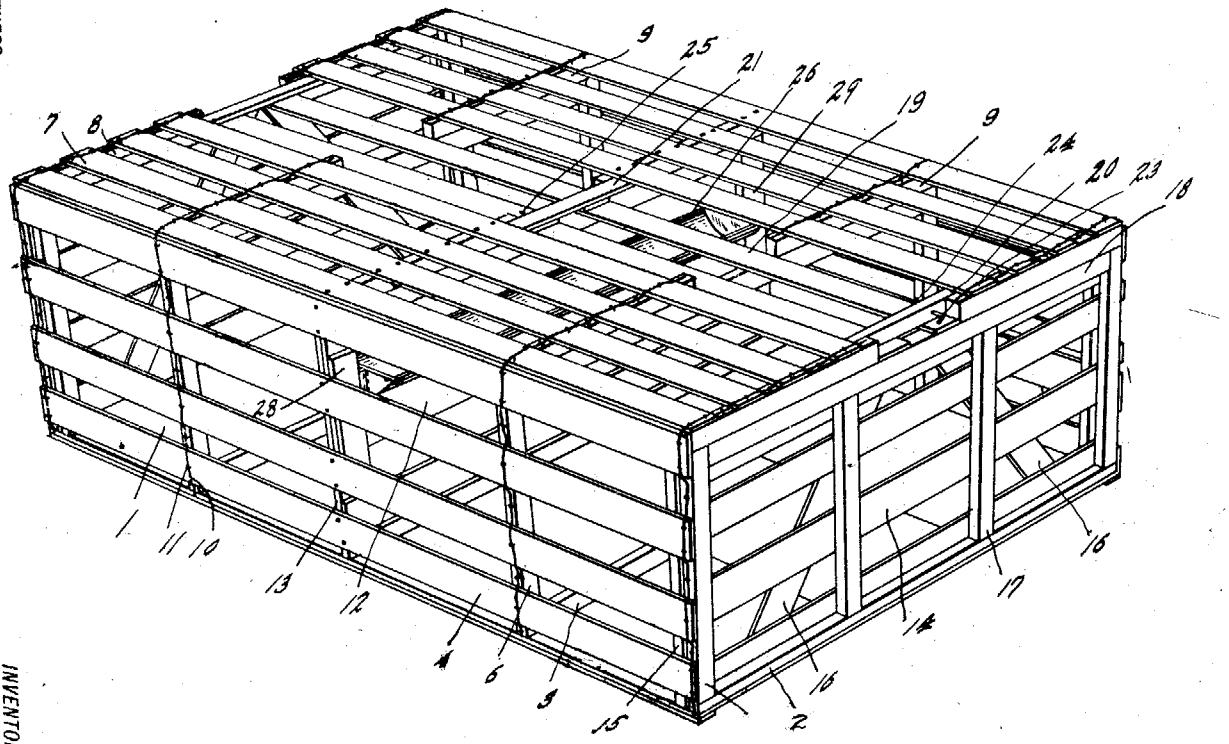
Figure 2:
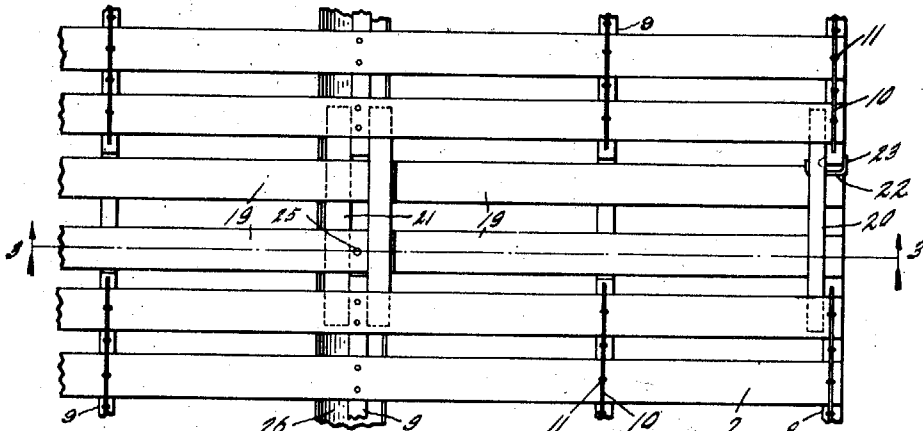
Figure 3:
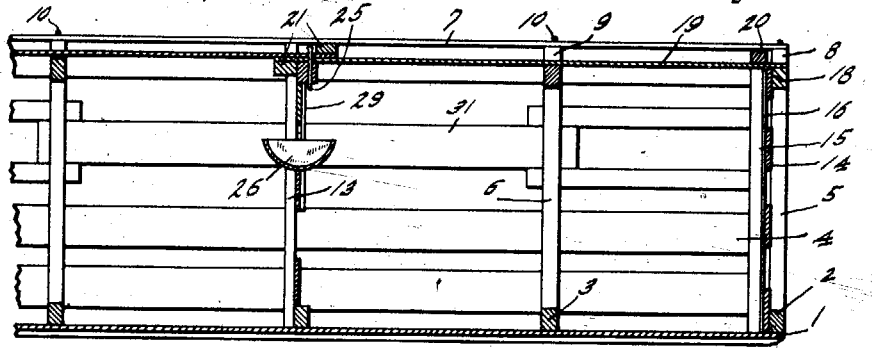

Figure 1 is a perspective view of my improved crate set up with the doors closed. Fig. 2 is a detail plan view, showing the arrangement of the doors. Fig. 3 is a detail vertical section, taken on a line corresponding to line 3—3 of Fig. 2, showing structural details. Fig. 4 is a detail plan view of the top, bottom and side walls of the crate in their knock-down extended position. Fig. 5 is a detail perspective, showing the opposite side of the crate from that shown in Fig. 1 and the arrangement of the side door and details of the feed trough support. Fig. 6 is a detail perspective, showing details of the feed trough support. Fig. 7 is a detail plan, showing the latch for one of the top doors.

In the drawings, the sectional views are taken looking in the direction of the little arrows at the ends of the section lines, and similar numerals of reference refer to similar parts throughout the several views.

Referring to the drawing, I provide bottom, top and side walls, the bottom wall being preferably solid,—that is, it is made up of boards placed edge to edge, while the top and side walls are made up of slats or spaced pieces. The bottom boards or pieces 1 are provided with cross pieces 2 at their ends, and where the crate is of considerable size, as shown in the drawings, with intermediate cross pieces 3. The side wall pieces 4 are provided with end cross pieces 5 and intermediate cross pieces 6. The top walls are preferably formed of sections, the top slats 7 being provided with end cross pieces 8 and intermediate cross pieces 9. These end and intermediate cross pieces are arranged in alinement, as clearly shown in Fig. 4. The side wall pieces are secured to their cross pieces by means preferably comprising binding wires 10, which are stapled, as at 11, to the side and cross pieces. The bottom, side wall and top wall sections are retained together in the flat, as shown in Fig. 4, by these binding wires. When set up, these binding wires serve to reinforce and strengthen the crate.

The partition is made up of horizontal slats 12 and vertical end pieces 13. When the crate is set up, the partition is arranged therein and secured by means of nails through the wall pieces, the same not being here illustrated. The end walls of the crate are, in the structure illustrated, also slatted, the slats 14 being provided with vertical end pieces 15 to which they are secured, the end pieces or end cleats 15 being arranged on the inner sides of the slats.

A pair of braces 16 is preferably provided, the braces being arranged in a diagonal or downwardly-diverging position. These braces are arranged on the inner sides of the slats of the end walls and are rigidly nailed thereto, the nails not being illustrated.

On the outer sides of the slats of the end walls are vertical cleats 17,—see Fig. 1. When the crate is set up, the top cleats 18 are secured to the cross pieces of the top sections, preferably being arranged under the same as in the structure illustrated. The vertical pieces or cleats 17 are arranged between the end pieces 2 of the bottom and the end cleats 18, serving to brace the structure as well as to support the top. These cleats 17 are preferably spaced, so as to support the top at each side of the door opening between the edges of the top sections. The top doors are arranged to slide on these top cleats between the ends of the top section cross pieces. This supports the doors in a plane below the top, so that the doors can be opened when another crate is resting on and partially covering the top.

The doors preferably are formed of longitudinal slats 19 and cross cleats or pieces 20 and 21. The inner ends of the longitudinal slats project over the partition and the inner cleat 21 of each door is arranged on the opposite side of the partition, the cleat of one door being arranged on the under side of its slats, while the cleat of the upper door is arranged on the upper side of its slats,—see Fig. 3—so that the doors telescope with each other. The intermediate cleats 9 of the top limit the opening of the doors. The ends of the door cleats are extended under the adjacent slats, so that the doors are slidably retained in position thereby.

I preferably provide a latch 22 for each door, the latch shown being in the form of a piece of wire arranged through the end cleat 20 provided with a laterally-turned engaging portion 23, adapted to engage over the end piece of one of the top sections. The latch is also provided with a stop 24 on its inner end, which engages with the door slat, preventing the engaging end 23 dropping down, when the door is opened, into position to engage the hand of the person reaching into the crate. The offset 24 also serves to retain the latch.

For greater security, when poultry is being shipped in the crate I preferably provide, in addition to these latches, a locking pin 25, which is arranged through registering holes provided therefor in the longitudinal slats of the doors and the central top cleat. I also preferably provide my improved crate with a feed trough 26 which is supported between the horizontal slats of the partition, so that it serves for both compartments. The trough is provided with a projection 27 at each end,—see Fig. 6. To provide sockets for these projections, I secure pieces 28 and 29 to the partitions which coact with the vertical end pieces and the slats, as will be obvious. The piece 29 is pivoted at 30, so that it may be swung down to release the trough. The crate is preferably provided with door openings at each side of its partition. The door for these openings is, in the structure illustrated, a slat 31 which is slidably arranged under the binding wires to slide between adjacent slats. This door serves to retain the pivoted piece 29 in its closed position. The door slat is provided with a central hole which may be engaged in the staple 32 on the partition. A key 33 through the staple serves to retain the door in place. In addition to providing a door through which the feed trough is introduced or removed, this side door is of advantage for introducing or removing the fowls when the crates are stacked.

By thus arranging the parts, I secure a crate which is very strong and rigid and capable of withstanding severe racking strains, as well as sustaining heavy loads as where other crates or articles are placed upon it. The crates may be shipped to the user in the knock-down and readily and conveniently set up. The doors are arranged so that they can be opened, as stated, when objects are resting on the top of or abutting the ends of the crate, or the side doors may be utilized conveniently.

I have illustrated and described my improvements in detail in the form in which I have embodied them in practice. I am aware, however, that they can be considerably varied in structural details without departing from my invention, and I have not attempted to illustrate such variations or modifications, as they will, no doubt, be obvious to those skilled in the art to which this invention relates.

Having thus described my invention, what I claim as new and desire to secure by Letters Patent is:

1. In a crate, the combination of the bottom, side and top wall pieces; cross pieces secured thereto to provide bottom, top and side walls, the securing means comprising binding wires whereby said walls are secured together in the flat and the wires constitute hinge connections for the walls, the top being formed in sections, one section being connected to each side wall, the inner edges of the top sections being spaced when the crate is erected, to provide a door opening; end walls for said crate comprising end wall pieces, cleats for the ends of said end wall pieces, arranged on the inner side thereof, the end wall pieces being adapted to rest against the inner sides of the side wall cross pieces, diagonally-disposed braces arranged on the inner sides of the end wall pieces, and vertically-disposed cleats arranged on the outer sides of the end wall pieces; top cleats arranged under the top cross pieces and extending across the space between the inner edges of the top wall sections, the top cleats at the ends of the crate being arranged on said vertically disposed end wall cleats; and a door slidably arranged on said top cleats between the ends of said top section cross pieces.

2. In a crate, the combination of the bottom, side and top wall pieces; cross pieces secured thereto to provide walls, the securing means comprising binding wires whereby said bottom, side and top walls are secured together in the flat and the wires constitute hinge connections for the walls, the top wall being formed in sections, one section being connected to each side wall, the inner edges of the top sections being spaced when the crate is erected to provide a door opening; end walls; top cleats extending across the space between the inner edges of the top sections to provide a rigid top; and a door slidably arranged on said top cleats between the ends of said top section cross pieces.

3. In a crate, the combination of the bottom, side and top wall pieces; cross pieces to provide bottom, side and top walls, secured thereto, the securing means comprising binding wires whereby the walls are secured together in the flat and the wires constitute hinge connections for the walls, the top being formed in sections, one section being connected to each side wall, the inner edges of the top sections being spaced to provide a door opening; end walls for said crate comprising end wall pieces, cleats for the ends of said end wall pieces, arranged on the inner side thereof, the end wall pieces being adapted to rest against the inner sides of the side wall cross pieces, vertically-disposed cleats arranged on the outer sides of the end wall pieces; and top cleats secured to the top cross pieces and extending across the space between the edges of the top sections, the vertically disposed end cleats being arranged to support the end top cleats.

4. A crate having a partition therein; a top for said crate having a door opening at each side of said partition; doors comprising slats, the inner ends of the slats being extended beyond the partition, the slats of the doors overlapping; cleats for said door slats disposed on opposite sides of the said partition, the cleat for the inner end of the under slats being on the under side thereof and that for upper slats being on the upper side thereof, said cleats being extended at each side under the top to provide retaining slides for the top.

5. A crate having a partition therein; a top for said crate having a door opening therein at each side of said partition; doors for said openings comprising slats, the inner ends of the slats being extended beyond the said partition; and cleats for the said door slats, the cleat for the inner end of each door being arranged on the opposite side of the partition and being extended at each end under the top to provide retaining slides for the top.

6. In a crate, the combination of the bottom, top and side wall pieces, the top being formed of sections, the inner edges of the top sections being spaced to provide a door opening; cleats extended across said door opening; and a door, said cleats being disposed to slidably support the door in a plane below the top of the crate, said door comprising longitudinal slats and cross pieces extended under the adjacent top to provide retaining slides for the top slats.

HUGH BROWN.